United States Patent [19]

Noakes

[11] 3,842,278
[45] Oct. 15, 1974

[54] LIQUID SCINTILLATION UNIT WITH LOW BACKGROUND NOISE

[76] Inventor: John E. Noakes, Rte. 3, Bar H Estates, Athens, Ga. 30601

[22] Filed: Jan. 8, 1973

[21] Appl. No.: 321,682

[52] U.S. Cl. .............................. 250/369, 250/367
[51] Int. Cl. ............................................. G01t 1/00
[58] Field of Search..................... 250/367, 369, 366

[56] References Cited
UNITED STATES PATENTS

| | | | |
|---|---|---|---|
| 2,739,242 | 3/1956 | Armistead........................ | 250/366 |
| 3,246,150 | 4/1966 | Stoddart et al. ................. | 250/369 |
| 3,308,296 | 3/1967 | Cowan et al...................... | 250/366 |
| 3,399,302 | 8/1968 | Carrell............................. | 250/366 |
| 3,539,806 | 11/1970 | Humphrey........................ | 250/367 |

Primary Examiner—Archie R. Borchelt
Assistant Examiner—Harold A. Dixon
Attorney, Agent, or Firm—Peter J. Sgarbossa; Charles Thomas; Walter E. Ramn

[57] ABSTRACT

An improved liquid scintillation unit in which the background noise is reduced through the use of fast pulse shaping and timing combined with a guard circuit. Pulses arriving from photomultiplier tubes are amplified and shaped by fast low noise electronis and subjected to fast timing circuitry which define precise coincident pulses with a minimum time jitter. By using time to amplitude conversion circuitry, pulses are also subjected to amplitude discrimination to remove very low amplitude electronic noise. Also, coincident pulses are rejected if they are in coincidence with pulses in a scintillation crystal guard which almost totally surrounds the sample counting chamber.

9 Claims, 3 Drawing Figures

LIQUID SCINTILLATION UNIT WITH LOW BACKGROUND NOISE

This invention relates to an improved liquid scintillation coincidence unit. More particularly, the invention resides in the use of a guard circuit, employing a scintillation crystal substantially enveloping the sample counting chamber and the event detecting photodetectors in combination with a discrimination circuit which discriminates against coincident pulses on the basis of the arrival times of the pulses. Pulses are subjected to time to amplitude conversion which further refines the coincidence pulses and enables them to be evaluated by pulse height analysis.

BACKGROUND OF THE INVENTION

The radioisotopes most frequently used in liquid scintillation counting measurements are carbon 14 and tritium. While carbon 14 emits beta rays having a sufficiently large energy level so as to be readily distinguishable from background radioactivity and electronic noise, the energy level of tritium is much lower so that it is les easily distinguishable from background radiation sources and electronic noise. Since the maximum energy level of beta particles from tritium is only 18 KeV, it is therefore particularly difficult to measure the quantity of tritium present in a sample where the concentration of tritium is quite low. Low levels of tritium occur naturally in samples used in dealing with hydrology, oceanography, meteorology, and chemical and biological systems in our environment. Future interest in samples containing low levels of tritium will also grow in the field of health physics and in monitoring the releases from nuclear power facilities, especially when fusion energy comes of age.

In conventional liquid scintillation coincidence counting, a sample is placed between two photomultiplier tubes aligned along a common axis. For a data pulse to be recorded at the pulse count register, a pulse from each photomultiplier tube must arrive at a coincidence gate within a specified time interval, usually 20 nanoseconds. Differential counting is accomplished by the use of pulse height discriminators which select or reject pulses on the basis of their pulse height, in which pulse height is proportional to the energy of the radioactive event causing the pulse. Background radiation is excluded through the use of lead shielding. Heretofore, the individual amplitudes of the component coincident pulses and the pulse amplitude sum have been the only bases for pulse discrimination.

In some instances, discrimination among coincident pulses has been made on the basis of the relative heights of the component pulses, since it can be shown that coincident pulses which differ widely in pulse amplitude more probably originated from background events as compared with coincident pulses which are more nearly equal in amplitude. This distinction is largely unworkable near the lower end of the tritium spectrum; however, at this low energy level the correlation between relative pulse height and probability of occurrence of a valid radioactive event decreases markedly.

Some use in liquid scintillation has been made of guard circuits employing scintillation crystal materials. In the past, however, no suitable geometry has been found which registers substantially all of the externally generated radioactive events that reach a liquid scintillation vial in a liquid scintillation measuring chamber, and also provides for an easy transfer of liquid scintillation vials into and out of the measuring chamber. Also, heavy lead shielding has heretofore proven to be a necessary adjunct to any scintillation crystal guard. This increases both the weight and the expense of the liquid scintillation unit.

SUMMARY OF THE INVENTION

It is an object of the present invention to provide a liquid scintillation counter which distinguishes between pulses which are the result of a true event in the sample and the pulses which are the result of non-sample events. A distinction can be made in the source of the scintillation on the basis of time arrivals of the pulses and whether the coincident pulses are in coincidence with events detected in the guard. This distinction can be made with much greater precision than in conventional systems because the pulses are much more precisely shaped so that the maximum acceptable interval between pulse peaks can be substantially reduced, thereby including almost all of the pulses originating from events of interest while excluding a large portion of the background or noise events which would otherwise be included. This improved pulse shaping is possible only because with this invention it is not necessary to preserve the pulse amplitude since no amplitude discrimination is performed directly on the pulses from the photodetectors. Instead, amplitude discrimination is performed on a subsequent pulse, the amplitude of which is a linear function of the time differential between the pulses from the photodetectors.

It is a further object to establish several independent criteria to which coincident pulses must conform in order to be classed as a valid radioactive event of interest. One criterion is established in the form of an energy window. A second criterion is also established for the maximum difference in the time of arrival of the pulse pair. In addition, the registration of a coincident pulse pair of dependent upon failure of the guard circuit to register a pulse, which would otherwise indicate that the detected event had an external origin, and so did not originate in the liquid sample being measured.

More specific performance objectives include the implementation of a liquid scintillation counting system which is sensitive enough to measure tritium levels of 10 tritium units, where a tritium unit, T.U. = 1 tritium atom/$10^{18}$ hydrogen atoms, without pre-chemical or tritium sample enrichment. Also, it is an object of the invention to obtain, at least, three-fold improvement in the ratio of the square of efficiency of valid event detection to the per cent of included counts which are attributable to undesired or background events.

In a broad aspect this invention is, in a liquid scintillation coincidence counting apparatus having a sample counting chamber with event detecting photodetectors in optical communication therewith, with said event detecting photodetectors connected to a coincident pulse detection and registration circuit, the improvement comprising a radiation guard circuit employing a solid scintillating material and connected in anti-coincident arrangement with said coincident pulse detection and registration circuit, wherein said coincident pulse detection and registration circuit includes a timing discrimination means for distinguishing between pulses on the basis of the arrival time of pulses induced in event detecting photodetectors by scintillations from a liquid scintillator in said sample counting chamber caused by radioactive events therein, and those pulses induced in said event detecting photodetectors as a result of other radioactive events.

The invention is more clearly illustrated in the accompanying diagrams in which.

Figure 1:
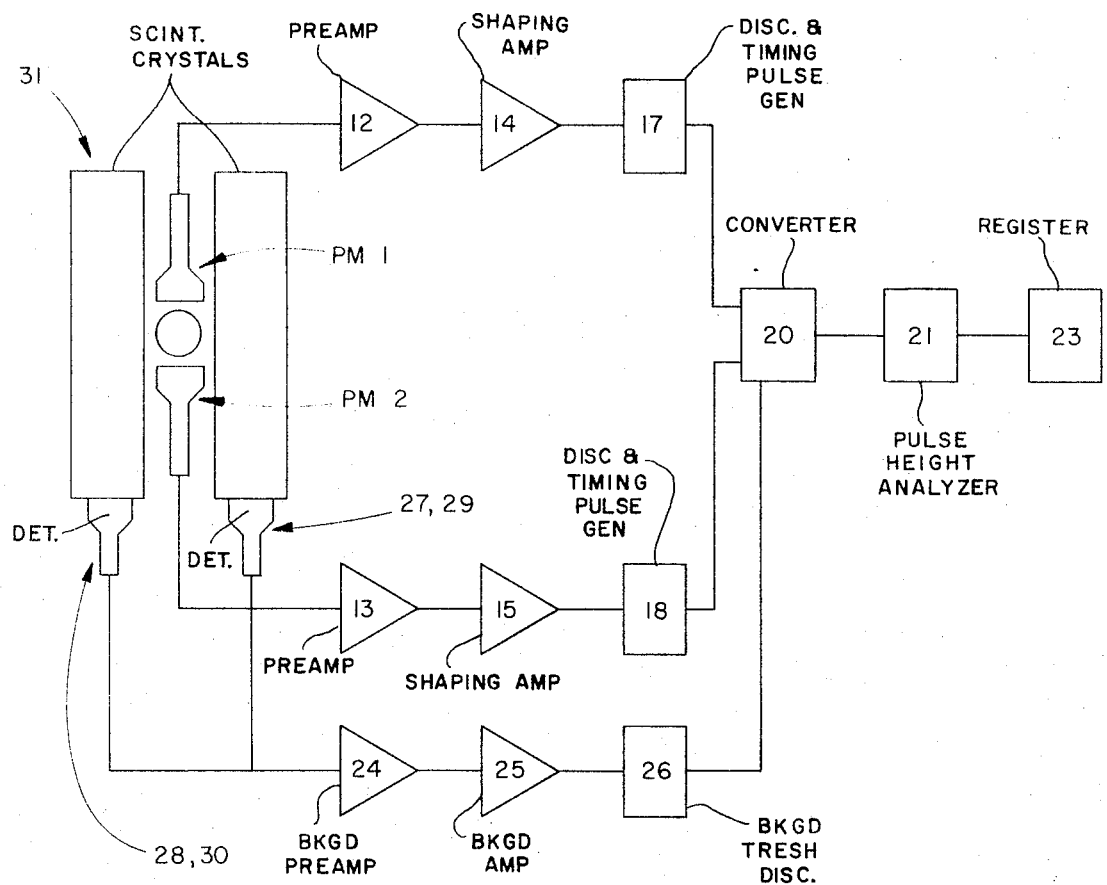
FIG. 1 is a block diagram of component elements of a preferred embodiment of the invention.

Referring now to FIG. 1, there is shown a liquid scintillation coincident counting apparatus including a sample 11 in a sample counting chamber in optical communication with first and second event detecting photomultipliers PM1 and PM2. Two bialkali cathode, gallium phosphide dynode, end-on photomultiplier tubes chosen for high quantum efficiency and low dark current are used as the photodetectors PM1 and PM2. The photodetectors PM1 and PM2 are connected to low noise preamplifiers 12 and 13 having the following minimum performance specifications: rise time less than 60 nanoseconds, unity gain, noise less than 0.1 mVrms, integral nonlinearity less or equal to 0.02 percent, respectively. The outputs of the preamplifiers 12 and 13 are respectively connected to very fast delay-line shaping amplifiers 14 and 15 of the following minimum performance specifications: shaping, double-delay-line, integration time constant 40 nanoseconds, gain 3-1,000, noise equal or less than 20 micro volts rms, crossover walk less than plus or minus 1 nanosecond for 20:1 dynamic range, time jitter (50 percent amplitude) FWHM 2.9 picoseconds, integral nonlinearity less or equal to plus or minus 0.05 percent. The amplifiers provide shaping for all output pulses and expand the pulse amplitude by a selected gain factor of from 3 to 1,000. Since no two event-detecting photodetector can be expected to exhibit exactly equal gain for a given number of photons, equal sensitivity in each of the amplifiers 14 and 15 is effected through a gain adjustment. While both unipolar and bipolar output pulses are generated by the amplifier, the bipolar output pulses are selected for timing purposes, as this pulse shape has minimum timing error. The amplifiers 14 and 15 have less than 1 nanosecond crossover walk for a 20:1 dynamic range. When a 40 nanosecond integration time constant is used, the time jitter at 50 percent amplitude is less than 3 picoseconds.

Following the amplifiers in the circuit are first and second timing pulse generator means 17 and 18 of the following minimum performance specifications: fast output −0.6 volt amplitude, rise time equal or less than 5 nanoseconds, width equal or less than 20 nanoseconds, delay 0.1-1.1 microseconds. Timing pulse generator means 17 and 18 are, respectively, associated with photodetectors PM1 and PM2. The output pulse from amplifier 14 becomes the input pulse for pulse generating means 17, and the output pulse from amplifier 15 becomes the input pulse for timing pulse generating means 18. As event threshold discrimination means is depicted as being incorporated within and connected to each of the timing pulse generating means 17 and 18. This threshold discrimination means first tests the pulses for low amplitude electronic noise which is eliminated before the pulses proceed through the timing pulse generating means. If the pulses do not achieve the requisite threshold amplitude, no pulse will be generated within the pulse generating means. Typically, the setting of the threshold discrimination means may be varied from 100 millivolts to 10 volts. An incremental discriminator may also be employed to establish an upper pulse height boundary, if desired. The setting of this incremental discriminator may typically be varied from 0 to 10 volts. The base line cross-over point of each of the output pulses from the amplifiers which achieve the threshold discrimination criteria initiates both a +5 volt square wave whose rise time is less than 20 nanoseconds and whose duration is nominally 500 nanoseconds, and a −0.6 volt fast logic pulse whose rise time is less than 5 nanoseconds and duration less than 20 nanoseconds. The fast logic pulse is designated as the output pulse of each of the timing pulse generating means since only a fast trigger is needed. Delays in the output pulse may be introduced into the timing pulse generators 17 and 18. A delay is always introduced into the timing pulse generator 18 to insure that the output generator 18 is always subsequent to the output of pulse generator 17. A delay of 100 nanoseconds to 1.1 microseconds is typically introduced, as required, between the base line crossover point of the pulse from the amplifier and the leading edge of the output pulse of the pulse generator. The pule delay means in the timing pulse generator 18 delays pulses from the timing pulse generator 18 for a predetermined interval based on the time spread of light pulses generated in a liquid scintillator.

It is worth noting that regardless of the input pulse amplitude, the output pulses from the timing pulse generators are all of equal amplitude and differ from each other only in time. It is also worth noting that the output pulses from the timing pulse generators are initiated not only by scintillations, but also by photodetector dark current discharges. Pulses originating from thes latter occurrences are eliminated by the conversion means 20 which is the next element in the circuit. As the probability of this meeting the timing requirements for coincidence is vanishingly small.

The converter 20 has the following minimum performance specifications: time resolution 10 picoseconds FWHM, integral nonlinearity less than 0.1 percent over the upper 90 percent of the range, output bipolar maximum amplitude 10 volts. Converter 20 is connected to both of the timing pulse generators 17 and 18 and is used to produce a bipolar signal having an amplitude proportional to the time interval between the timing signals from the first timing pulse generating means 17 and the second timing pulse generating 18. In addition to the inputs from pulse generating means 17 and 18, the converter 20 also receives a third input as an anti-coincident gate from the radiation guard circuit of this invention. This anti-coincident gate suppresses the output of the converter 20 if an input is received by the anti-coincident gate from any of the guard photodetectors 27, 28, 29, or 30 subsequent to the input from the timing pulse generator 17 and prior to the input from the timing pulse generator 18. If no pulse is received by the anti-coincident gate in converter 20 from any of the guard photodetectors during this interval, the converter 20 will produce an output signal of an amplitude which is a linear function of elapsed time between the signals from timing pulse generator 17 and 18. Because the pulse from timing pulse generator 18 is always delayed, the pulse from the timing pulse generator 17 starts the converter 20. The conversion process is terminated by the signal from the timing pulse generator 18. Typically, the signal from timing pulse generator 18 is delayed a minimum of 25 nanoseconds after the corresponding signal from timing pulse generator 17. The converter 20 is typically equipped with time-limiting cut-off circuit so that if the time separating the start and stop pulses from the timing pulse generators 17 and 18 is less than the selected maximum time limit, an output pulse from the converter 20 may be produced. If, however, the pulse from generator 18 arrives after the maximum allowable time limit, no output data pulse may be generated by the converter 20. Typically, a 50 nanosecond maximum time limit may be used so that the probability of selecting false data is minimized, since a 25 nanosecond delay is already imposed on the timing pulse generators. Alternatively, the maximum time limit may be switch selectable to 250 or 500 nanoseconds.

It can be seen that to provide an output data pulse from converter 20, the pulse from PM1 and PM2 are shaped by the preamplifiers 12 and 13 and shaped even more precisely by amplifiers 14 and 15 so that the maximum interval between pulse originating from events of interest can be predicted with much greater accuracy. This allows the maximum acceptable interval between pulses from the photodetectors PM1 and PM2 to be substantially reduced, thereby including practically all of the pulses emanating from events of interest in the scintillating liquid in sample 11 while excluding a large portion of the background or noise events which would otherwise be included. Such noise pulses might, for example, be caused by dark current discharges in the photodetectors PM1 and PM2. The improved pulse shaping by preamplifiers 12 and 13 and amplifiers 14 and 15 is possible only because the amplitude of the pulses from photodetectors PM1 and PM2 need not be preserved, since these pulses are not tested directly by an amplitude discriminator. Instead, amplitude discrimination is performed by generating a data pulse from converter 20. This data pulse is generated from inputs from timing pulse generators 17 and 18, which cause a data pulse to be generated within converter 20 the amplitude of which is a linear function of the time differential between pulses from the timing pulse generators 17 and 18. Assuming an output from the converter 20, a pulse height analyzer means 21 with an upper and lower discriminator is utilized to further distinguish between events of interest and other radioactive events. The pulse height analyzer means 21 suppresses a pulse output for pulses from the photodetectors PM1 and PM2 which differ in time of occurrence by greater than an acceptable time interval. The upper and lower discriminators of the pulse height analyzer means 21 are adjusted to define a pulse amplitude window that includes the probability distribution peak of pulses from the photodetectors PM1 and PM2 generated as a result of scintillations occurring in a liquid scintillator in a sample positioned in the sample counting chamber, as opposed to pulses from the photodetectors PM1 and PM2 generated by some other source such as electronic noise. Naturally occurring radioactive potassium, K 40, is present to some extent in both quartz and glass vials. A radioactive emission of the K 40 isotopes creates a low level scintillation in the sample container which is detected by the photodetectors PM1 and PM2. Such scintillations are indistinguishable from scintillations caused by a liquid scintillator in the sample 11 in conventional systems, but may be distinguished in the present invention as taught herein.

As the average mass number of liquid scintillators is approximately six, the Compton Scatter cross-section at the 1.46 MeV gamma energy of K 40 is on the order of 0.002 $cm^2$/gm as compared to the photoelectric cross-section of less than $1 \times 10^{-6}$ $cm^2$/gm. The probability of a K 40 gamm ray being Compton scattered by the liquid scintillator into the guard crystal is very large. Hence, very few K 40 gamma rays will be counted by this system.

The output of the pulse height analyzer 21 is fed to a pulse count register 23 of the following performance specifications: maximum counting rate 25 MHz, maximum count seven digit, pulse pair resolution 50 nanoseconds. This pulse count register thereby records valid radioactive events of interest occurring within the sample 11.

Figure 2:
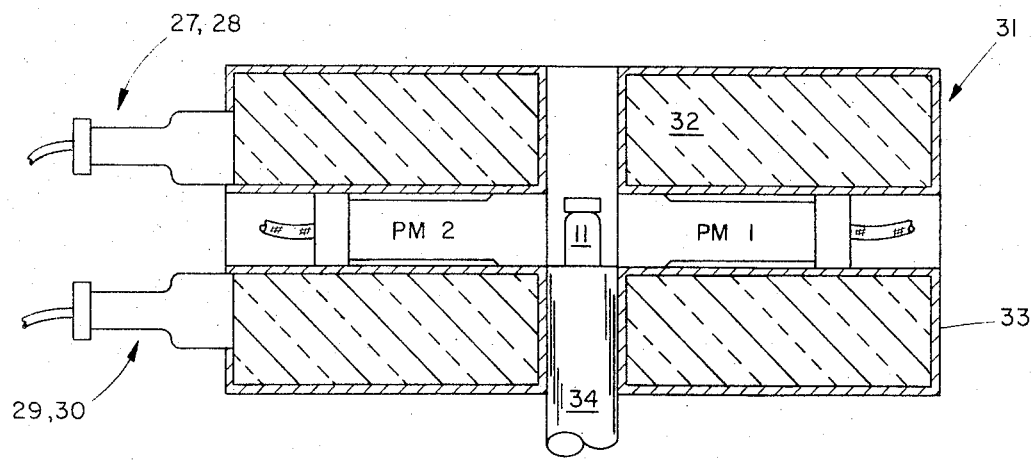
FIG. 2 illustrates the geometry of the solid scintillator of the guard circuit and the sample measuring chamber.

FIGS. 1 and 2 together illustrate the radiation guard circuit of this invention. The guard circuit employs a solid scintillation crystal assembly 31 and guard photodetectors 27, 28, 29, and 30 connected in anticoincident arrangement with the coincident pulse detection and registration circuit. This anticoincident arrangement is achieved in the illustrated embodiment by a connection of the guard photodetectors, through the background preamplifier 24 having the following specifications: rise time less than 60 nanoseconds, unity gain, noise less than 0.1 mV rms, integral nonlinearity equal to or less than 0.02 percent. The background amplification means 25, connected to background preamplifier 24, has the following specifications: shaping, active filter approximately Gaussian, gain 1–640, noise equal to or less than 10 microvolts, rms, integral nonlinearity equal to or less than plus or minus 0.15 percent. Background amplifier 24 is connected to the background threshold discrimination means 26. The preamplifier 24 provides amplification but virtually no pulse shaping. The amplifier 25 is used to provide further amplification and shaping of the output pulse. The background threshold discrimination means 26 is typically an integral discriminator requiring an input pulse of at least 50 nanoseconds in duration and up to a +10 volts amplitude. The output of the background threshold discrimination means 26 is connected in anti-coincidence with the outputs of the timing pulse generators 17 and 18 at the converter 20 as previously described. The output of the threshold discriminator 26 is composed of those pulses that exceed a predetermined threshold amplitude. It is necessary to introduce a delay into the output of threshold discriminator 26 so that when a pulse is generated by one or more of the background or guard photodetectors concurrently with coincident pulses from the event detecting photodetectors PM1 and PM2, the output of the threshold discriminator 26 is received by converter 20 in the interval between receipt of the pulses from the timing pulse generators 17 and 18.

The most effective construction of the radiation guard circuit is illustrated in FIG. 2 where there is provided a cylindrical scintillation crystal 32, usually some composition of sodium iodide activated with thalium, having an axial hole therein within which the photodetectors PM1 and PM2 are aligned in opposing relationship. The sample counting chamber may thereby be considered as being bounded by the opposing photosensitive faces of the photodetectors PM1 and PM2 and the interior surfaces of the scintillation crystal assembly 31. The crystal 32 is surrounded by an opaque covering 33, usually aluminum foil. The aluminum foil 33 has photodetector accommodating apertures therein, as illustrated in FIG. 2. The guard photodetectors 27 through 30, are positioned at the photodetector accommodating apertures at one or both ends of the cylinder in optical communication with the scintillating crystal 32, while the sample counting chamber and the event detecting photodetectors PM1 and PM2 are optically isolated from the crystal 32. A transverse passageway is defined within the crystal 32 through the counting chamber, and a sample transfer means in the form of an elevator 34 is provided for bringing radioactive samples 11 into the sample counting chamber for sample analysis and for carrying the samples 11 from the sample counting chamber subsequent to analysis.

Figure 3:
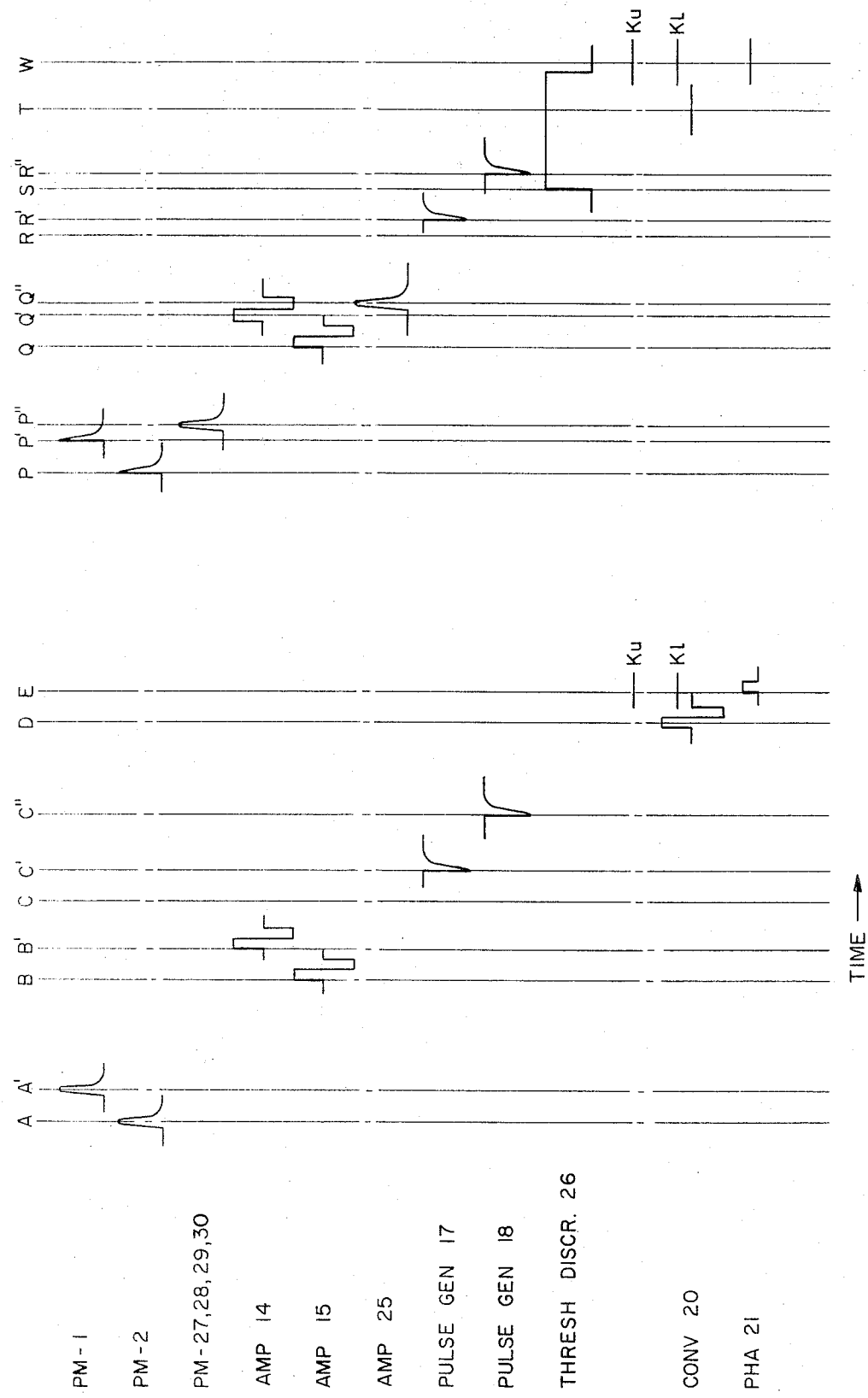
FIG. 3 is a timing diagram for two different radioactive events.

The operation of the electronic circuitry of the present invention may be more clearly illustrated by reference to the pulses generated as depicted in FIG. 3. In the first instance, coincident pulses are eceived by the photodetectors PM2 and PM1 at times A and A', respectively. The interval between times A and A' is well within the allowable coincidence interval of the liquid scintillation unit used, so that the pulses from PM1 and PM2 may be considered to be coincident pulses. As a result of the pulses in PM2 and PM1, corresponding fast rise time bipolar output pulses are generated at times B and B' from the amplifiers 15 and 14 respectively. A logic timing pulse is generated by pulse generator 17 at time C', as the bipolar output of amplifier 14 crosses over from positive to negative. The cross-over of the bipolar pulse from amplifier 15 would cause a timing pulse to be generated by pulse generator 18 at time C, but the pulse delay mechanism in pulse generator 18 delays that pulse so that it occurs instead at time C''. Since the pulse from PM2 and PM1 originated from the liquid scintillator in the vial 11, and since the vial 11 is optically isolated from the crystal assembly 31, no output is received from the threshold discriminator 26. This results in a signal being generated by converter 20 at time D which is proportional in amplitude to the time interval between C' and C''. This pulse amplitude lies within the acceptable range between the upper discriminator $K_u$ and the lower discriminator $K_L$ in the pulse height analyzer 21 so that an output pulse is generated by pulse height analyzer 21 at time E, thereby registering the occurrence of a radioactive event in the liquid scintillator in vial 11 in the pulse counter register 23.

The next radioactive event detected occurs as a result of cosmic ray or K 40 emission in the glass vial or one of the phototubes PM1 or PM2 and which passes through the crystal 32 and into the sample 11. As a result of this radioactive event, the liquid scintillator in the sample 11 generates coincident pulses at times P and P' from photodetectors PM2 and PM1 respectively. These pulses respectively trigger pulses at times Q and Q' in the amplifiers 15 and 14. These result in output pulses from the pulse generators 18 and 17 at times R'' and R', respectively. Again, the delay in pulse generator 18 prevents the output of pulse generator 18 from occurring at time R. Because the event detected is a cosmic ray passing through the crystal 32, a scintillation occurs within the crystal 32 and is detected by one or more of the guard photodetectors 27 through 30. These guard photodetectors initiate a pulse at time P'' which is amplified in shape at time Q'' by amplifier 25 and which produces an output at the threshold discriminator 26 at time S. Because the output from threshold 26 is received at converter 20 between the times R' and R'', the converter 20 yields no output at time T. There is, therefore, no output from pulse height analyzer 21, which would otherwise occur at time W, and the erroneous event is therefore not recorded.

From experience it can be shown that the "figure of merit," the ratio of the square of the efficiency of collection of events of interest in the liquid scintillator to the collection efficiency of other events, is, at least, three times as grat as in the liquid scintillation counting systems presently available. This improvement is a very significant step forward in the field of liquid scintillation counting.

The embodiments depicted in the examples cited are for illustrative purposes only, and no unnecessary limitations should be construed therefrom. For example, there is a wide latitude in the circuit configuration which may be employed within the scope of this invention as defined in the claims.

I claim as my invention:

1. In a liquid scintillation coincidence counting apparatus having a sample counting chamber with event detecting photodetectors in optical communication therewith, with said event detecting photodetectors connected to a coincident pulse detection and registration circuit, the improvement comprising radiation guard circuit employing a solid scintillating material and connected in anti-coincident arrangement with said coincident pulse detection and registration circuit, said coincident pulse detection and registration circuit having a timing discrimination means including means associated with each of said event detecting photodetectors for shaping and amplifying pulses from said photodetectors to represent the time interval between pulses from respective photodetectors, and conversion means responsive to said shaping means for generating an information pulse whose amplitude varies as a function of said time interval, whereby pulses induced in said photodetectors due to scintillations from a liquid scintillator in said sample may be discriminated from pulses induced in said photodetectors by other radioactive events.

2. The apparatus of claim 1 wherein said radiation guard circuit is comprised of a cylindrical scintillation crystal with an axial hole therein, an opaque covering on the surfaces of said crystal with photodetector accommodating apertures located at, at least, one end of said cylindrical scintillation crystal, whereby said sample counting chamber and said event detecting photodetectors are optically isolated from said crystal, and guard photodetectors are positioned at said photodetector accommodating apertures in optical communication with said scintillation crystal, and wherein said event counting photodetectors are aligned in opposing relationship in the axial hole defined in said scintillating crystal, thereby defining the boundaries of said sample counting chamber at the interior of said scintillation crystal.

3. The apparatus of claim 2 wherein a transverse passageway is defined within said crystal through said sample counting chamber, and a sample transfer means is provided for bringing radioactive samples into said sample counting chamber for sample analysis and for carrying said samples from said sample counting chamber subsequent to analysis.

4. The apparatus of claim 1 wherein said timing discrimination means further includes first and second timing pulse generating means and event threshold discrimination means respectively associated with different ones of said shaping and amplifying means, pulse delay means for delaying pulses from the second timing pulse generating means for a predetermined interval based on the probably proximity in time of the light pulses generated in a liquid scintillator by events of interest, with said conversion means generating said information pulses with an amplitude correlated to the elapsed time interval between pulses received from said first and second timing pulse generating means, said timing discrimination means also including pulse height analyzer means with an upper and lower discriminator for suppressing said information pulse output for pulses from said first and second event detecting photodetectors which differ in time of occurrence by greater than an acceptable time interval.

5. The apparatus of claim 4 wherein said amplifier means generate bipolar pulses, each such pulse changing polarity after an interval independent of the pulse amplitude, and said conversion means including a pulse generator and generating said information pulse with amplitude increasing as a linear function of elapsed time, and operation of said conversion means being terminated as a result of a pulse from said second event detecting photodetector.

6. The apparatus of claim 5 wherein said upper and lower level discriminators of said pulse height analyzer means are adjusted to define a pulse amplitude window that includes the time distribution peak of pulses from said first and second timing pulse generating means generated as a result of scintillations occurring in a liquid scintillator in a sample positioned in said sample counting chamber, and excludes all pulse falling beyond said pulse amplitude window.

7. The apparatus of claim 5 wherein said conversion means is equipped with an anticoincident gate connected to said event detecting photodetectors and to said guard photodetectors for suppressing the output of said conversion means if an input is received at said anti-coincident gate from any of said guard photodetectors subsequent to the input from said first event detecting photodetector and prior to the input from said second event detecting photodetector.

8. A liquid scintillation coincidence counting apparatus comprising a sample counting chamber, first and second photodetectors in optical communcation therewith, amplifier means connected to each of said photodetectors, first and second timing pulse generating means connected to said amplifier means and associated respectively with said first and second photodetectors, a pulse delay mechanism in said amplifier means and associated respectively with said first and second photodetectors, a pulse delay mechanism in said second timing pulse generating means set to insure that for coincident pulses from said first and second photodetectors, pulses generated by said second timing pulse generating means are delayed with respect to timing pulses generated by said first timing pulse generating means, conversion means connected to both of said timing pulse generating means, pulse height analyzer means with an upper and lower discriminator connected to said conversion means, solid scintillating radiation guard crystal at least partially surrounding the sample counting chamber and having guard photodetectors in optical communcation therewith, background delay and amplifier means and background threshold discrimination means associated with said guard photodetectors, an anti-coincidence circuit with inputs from said first and second photodetectors and from said guard photodetectors for governing the output of said pulse height analyzer means, and pulse count register means for recording coincident pulses from said first and second photodetectors which are received in anti-coincidence with pulses from said guard photodetectors when said pulse height analyzer means yields an output.

9. In a liquid scintillation coincidence counting apparatus having a sample counting chamber with event detecting photodetectors in optical communication therewith, with said event detecting photodetctors connected to a coincident pulse detection and registration circuit, the improvement comprising a radiation guard circuit employing a solid scintillating material and connected in anti-coincident arrangement with said coincident pulse detection and registration circuit, wherein said coincident pulse detection and registration circuit includes a timing discrimination means for generating a data pulse having an amplitude that is a linear function of time differential between pulses emanating from said event detecting photodetectors and including amplitude discrimination means for defining a pulse amplitude window for discriminating between said data pulses, whereby discrimination is effected between pulses on the basis of the arrival time of pulses induced in said event detecting photodetectors by scintillations from liquid scintillator in said sample counting chamber caued by radioactive events therein, and those pulses induced in said event detecting photodetectors as a result of other radioactive events.

* * * * *